(12) United States Patent
Ben Abdelaziz et al.

(10) Patent No.: US 12,124,665 B2
(45) Date of Patent: Oct. 22, 2024

(54) HUMAN-MACHINE INTERFACE DEVICE AND VEHICLE COMPRISING SUCH A HUMAN-MACHINE INTERFACE DEVICE

(71) Applicant: FAURECIA INTERIEUR INDUSTRIE, Nanterre (FR)

(72) Inventors: Omar Ben Abdelaziz, Tille (FR); Adnen Nouri, Cergy (FR); Amine Ben Mhamed, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 18/471,054

(22) Filed: Sep. 20, 2023

(65) Prior Publication Data
US 2024/0103674 A1    Mar. 28, 2024

(30) Foreign Application Priority Data
Sep. 20, 2022    (FR) ..................................... 22 09470

(51) Int. Cl.
*G06F 3/044* (2006.01)
*B60K 35/00* (2024.01)
*B60K 35/10* (2024.01)

(52) U.S. Cl.
CPC ............ *G06F 3/0447* (2019.05); *B60K 35/10* (2024.01); *G06F 3/0443* (2019.05); *B60K 2360/128* (2024.01); *B60K 2360/1434* (2024.01)

(58) Field of Classification Search
None
See application file for complete search history.

(56) References Cited

U.S. PATENT DOCUMENTS

| | | | |
|---|---|---|---|
| 2003/0231197 A1 | 12/2003 | Janevski | |
| 2005/0057528 A1 | 3/2005 | Kleen | |
| 2009/0250267 A1 | 10/2009 | Heubel et al. | |
| 2014/0307179 A1* | 10/2014 | Zhao | G03H 1/02 349/12 |
| 2021/0031711 A1* | 2/2021 | Marcolino Quintao Severgnini | B60K 35/10 |

(Continued)

FOREIGN PATENT DOCUMENTS

| | | |
|---|---|---|
| DE | 29504052 U1 | 6/1995 |
| DE | 102004005501 A1 | 8/2005 |

OTHER PUBLICATIONS

French Search Report corresponding to application FR2209470, dated Apr. 12, 2023, 2 pages.

*Primary Examiner* — Benjamin C Lee
*Assistant Examiner* — Emily J Frank
(74) *Attorney, Agent, or Firm* — Reising Ethington P.C.

(57) ABSTRACT

A human-machine interface device includes a touch panel having a front surface intended to be visible to a user and a rear surface, the touch panel being configured to detect an interaction of the user with the touch panel and being resiliently deformable, and a plurality of actuators arranged behind the touch panel, each actuator being controllable between a retracted configuration and an extended configuration wherein the actuator deforms an area of the touch panel located opposite the actuator by forming a bump protruding from the front surface of the touch panel. The human-machine interface device has at least one configuration wherein several actuators in the extended position together define a single control element protruding from the front surface of the touch panel.

13 Claims, 8 Drawing Sheets

(56) References Cited

U.S. PATENT DOCUMENTS

2021/0132787 A1\* 5/2021 Jung .................... G06F 3/0488
2021/0309877 A1\* 10/2021 Gao ..................... G06F 3/0443
2021/0398562 A1\* 12/2021 Verbeke ................ B60K 35/00

\* cited by examiner

HUMAN-MACHINE INTERFACE DEVICE AND VEHICLE COMPRISING SUCH A HUMAN-MACHINE INTERFACE DEVICE

TECHNICAL FIELD

The present invention relates to the field of human-machine interface devices, in particular for vehicles, in particular motor vehicles.

BACKGROUND

Motor vehicles are generally provided with a human-machine interface device by means of which the driver can control one or more on-board systems, such as an infotainment system, a heating, air conditioning and ventilation system (also known by the acronym HVAC), a navigation system or a parking assist system.

It is desirable to have a human-machine interface device that allows the driver to easily control the various on-board systems of the motor vehicle while allowing that person to stay focused on driving the motor vehicle.

SUMMARY

To this end, the invention proposes a human-machine interface device comprising a touch panel having a front surface intended to be visible to a user and a rear surface, the touch panel being configured to detect an interaction of said user with the touch panel, the touch panel being resiliently deformable, and a plurality of actuators arranged behind the touch panel, each actuator being controllable between a retracted configuration and an extended configuration wherein the actuator deforms an area of the touch panel located opposite the actuator by forming a bump protruding from the front surface of the touch panel, the human-machine interface device comprising at least one configuration wherein several actuators in the extended position together define a single control element protruding from the front surface of the touch panel.

The use of several actuators to jointly form a single control element in a configuration of the human-machine interface device makes it possible to form a control element having a chosen shape and mode of interaction (for example a push button, a dial or a cursor), for example as a function of images displayed on a display screen of the human-machine interface device and/or of circumstances detected by sensors.

According to particular embodiments, the human-machine interface device comprises one or more of the following optional features, taken individually or in any technically possible combination:
- each control element is selected from a touchpad, a push button, a linear cursor, and a dial;
- each actuator is a dielectric elastomer actuator;
- at least one of the actuators is in extended position in at least two distinct configurations of said human-machine interface device wherein said at least one actuator defines two different control elements;
- the actuators are distributed behind the touch panel in a matrix arrangement;
- the distance between each actuator and each adjacent actuator is between 0.2 cm and 1.0 cm, in particular between 0.3 cm and 0.7 cm;
- the touch panel defines a plurality of sensors distributed on the touch panel;
- the touch panel defines a respective sensor opposite each actuator;
- the touch panel comprises an outer layer covering a sensitive layer configured to detect an interaction of said user with the touch panel;
- the sensitive layer defines a plurality of sensors, in particular capacitive sensors and/or resistive sensors;
- the sensitive layer is a layer of stretchable ink printed by forming patterns defining each sensor.

The invention also relates to a vehicle comprising a human-machine interface device as defined above.

BRIEF DESCRIPTION OF THE DRAWINGS

The invention and its advantages will be better understood on reading the following disclosure, given solely by way of non-limiting example and made with reference to the appended drawings, in which.

DETAILED DESCRIPTION

Figure 1:
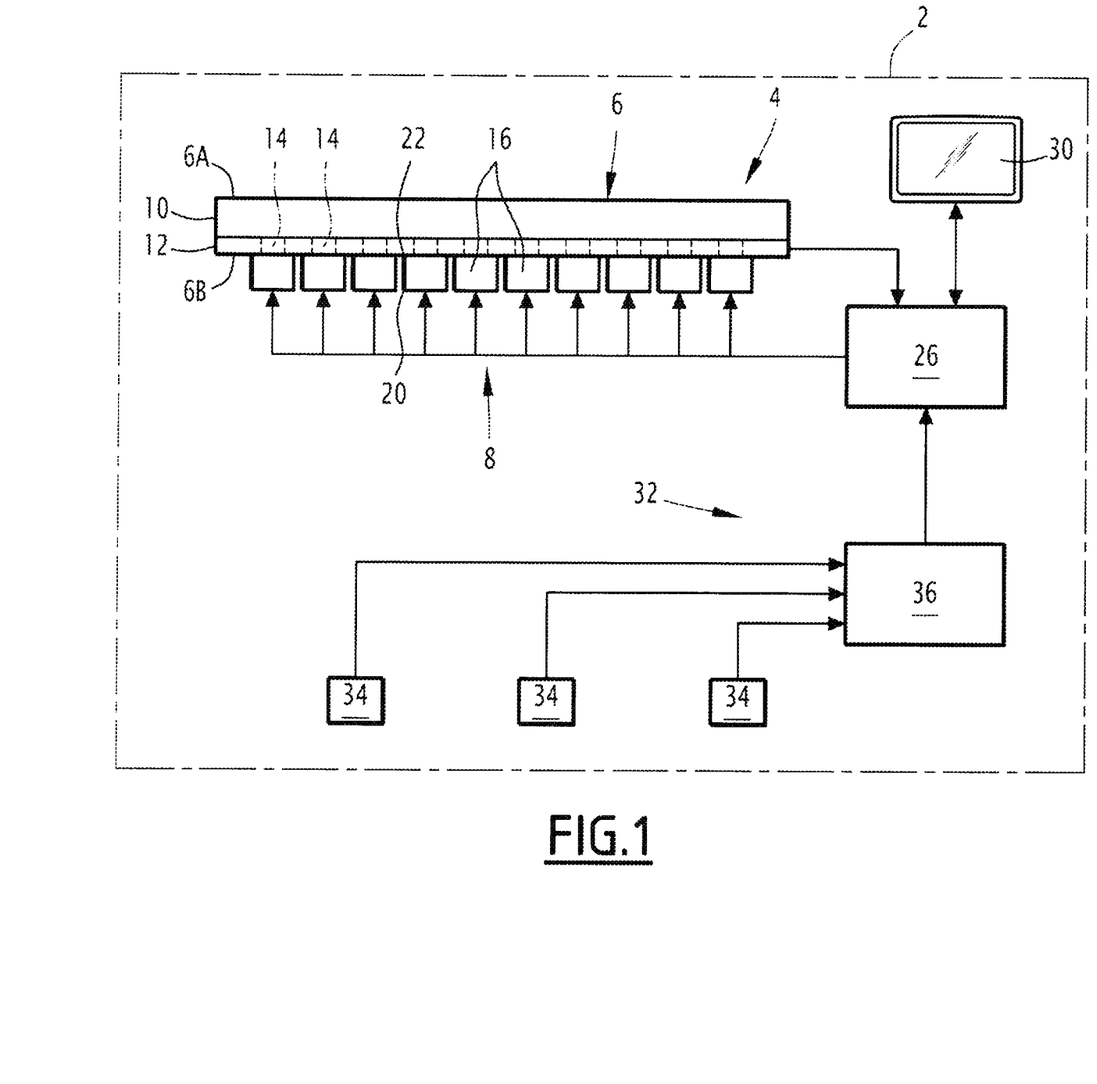
FIG. 1 is a schematic view of a configurable human-machine interface device, in a first configuration.

As shown in FIG. 1, a vehicle 2 comprises a configurable human-machine interface device 4 comprising a touch panel 6 configured to detect touch interactions of a user on the touch panel 6, the touch panel 6 being resiliently deformable, and a deformation assembly 8 configured to modify the shape of the touch panel 6 so as to generate one or more bumps protruding from a front face of the touch panel 6.

The touch panel 6 has a front surface 6A and a rear surface 6B. The front surface 6A is intended to be visible and accessible to the user. The rear surface 6B is opposite the front surface 6A.

The touch panel 6 is configured to detect the contact or proximity of one or more user fingers with the front surface 6A of the touch panel 6.

The touch panel 6 is resiliently deformable so that a pressure applied locally to an area of the rear surface 6B of the touch panel 6 generates a bump on the area facing the front surface 6A of the touch panel 6.

The touch panel 6 is for example laminated and comprises an outer layer 10 and a sensitive layer 12 located under the outer layer 10. The external layer 10 and the sensitive layer 12 are both resiliently deformable to obtain the resiliently deformable touch panel 6.

The outer layer 10 is for example made of polyvinyl chloride (PVC), ethylene-propylene-diene monomer (EPDM), silicone, polyurethane (PU) or natural or synthetic leather.

The sensitive layer 12 defines, for example, a plurality of sensors 14 distributed over the entire surface of the sensitive layer 12 and making it possible to detect a contact or proximity of a user's finger with the front surface 6A of the touch panel 6.

Each sensor 14 of the sensitive layer 12 defines, for example, a resistive sensor or a capacitive sensor.

The sensitive layer 12 is for example made using a conductive stretchable ink. Such inks are, for example, sold by DuPont®, in particular under the reference CB100—Conductive Via Fill, the reference CB028—Flexible Silver Shielding and the reference CB459—Thin, High Adhesion Platable Seed Layer.

Each sensor 14 is for example defined by a particular pattern of the sensitive layer 12, in particular when the sensitive layer 12 is made in the form of an electrically conductive ink layer.

The deformation assembly 8 comprises a plurality of actuators 16 arranged behind the touch panel 6, that is, on the side of the rear surface 6B of the touch panel 6.

The actuators 16 are distributed behind the touch panel 6. Each actuator 16 is located opposite a respective area of the touch panel 6.

The sensitive layer 12 comprises, for example, a respective sensor 14 opposite each actuator 16.

Each actuator 16 can be controlled individually between an inactive configuration, wherein the touch panel 6 has a first shape, and active configuration wherein the touch panel 6 has a second shape.

In particular, each actuator 16 is configured so that the switching of the actuator 16 from the inactive configuration to the active configuration causes the resilient deformation of the touch panel 6 opposite this actuator 16, forming a bump protruding from the front surface 6A of the touch panel 6 in line with the actuator 16.

Each actuator 16 in the active configuration bears on the rear surface 6B of the touch panel 6 so as to form a bump projecting from the front surface 6A of the touch panel 6.

In FIG. 1, all the actuators 16 are in the rest position. The touch panel 6 is in a rest position not deformed by the actuators 16. Preferably, the front surface of the touch panel 6 is substantially planar.

Figure 2:
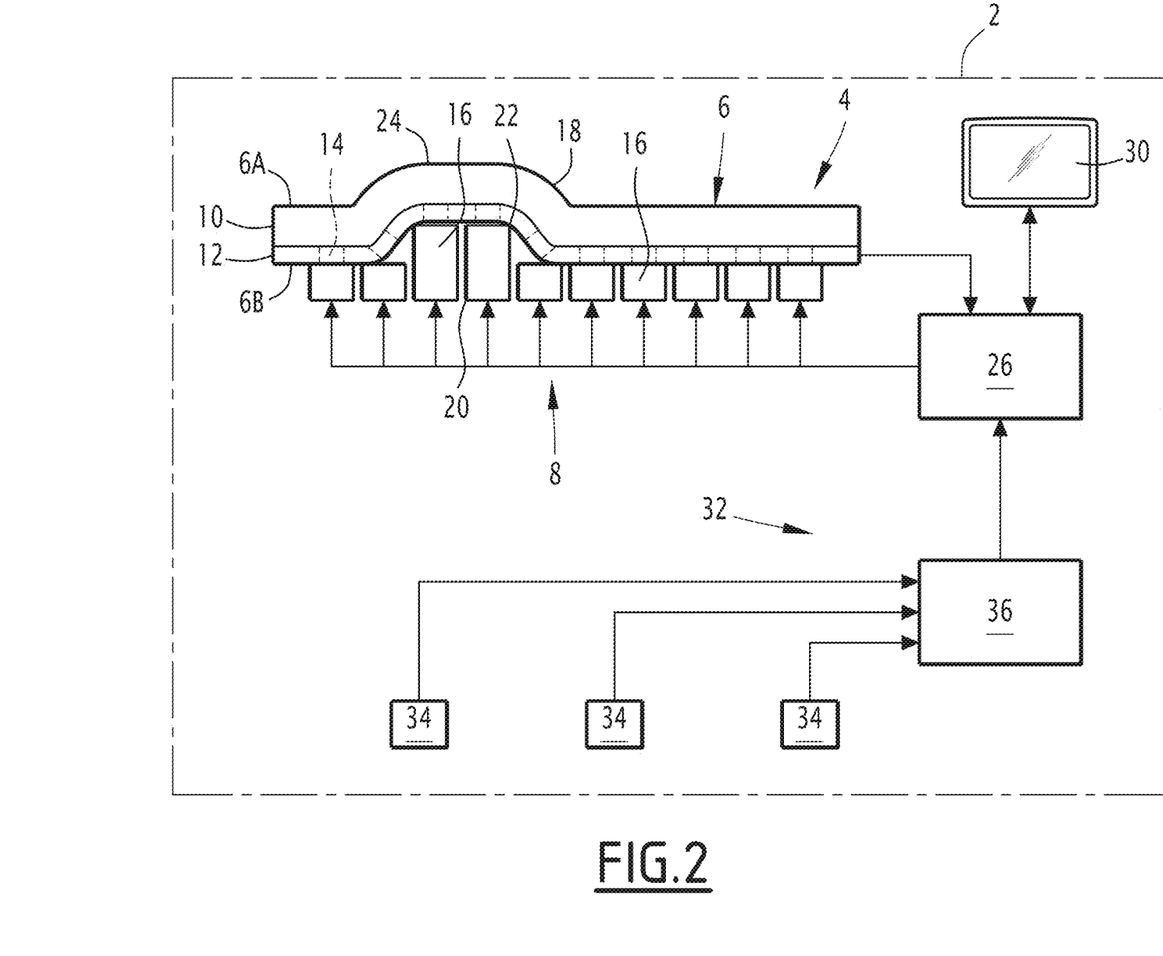
FIG. 2 is a schematic view of the configurable human-machine interface device, in a second configuration.

In FIG. 2, two adjacent actuators 16 are in the active position and generate together a bump 18 which extends above these two actuators 16 in the active position, the rest of the touch panel 6 not being deformed.

Each actuator 16 has for example a first fixed portion 20 and a second movable portion 22 in contact with the rear surface 6B of the touch panel. In the inactive configuration, the second portion 22 is close to the first portion 20 and in the active configuration, the second portion 22 is away from the first portion 20.

The movement of the second portion 22 relative to the first portion 20 is carried out, for example, electrically, electromagnetically or piezoelectrically.

In one embodiment, each actuator 16 is a dielectric elastomer actuator. The electrical current or electrical voltage supply of the actuator 16 makes it possible to vary the distance between the first portion 20 and the second portion 22.

In one embodiment, each actuator 16 comprises the first portion 20 and the second portion 22 located at both ends of a stack of at least two electrodes and one or more dielectric layers made of an elastomeric material inserted between the electrodes. The electrical voltage supply of the electrodes makes it possible to vary the height of the stack, and thus to vary the distance between the first portion 20 and the second portion 22.

Figure 3:
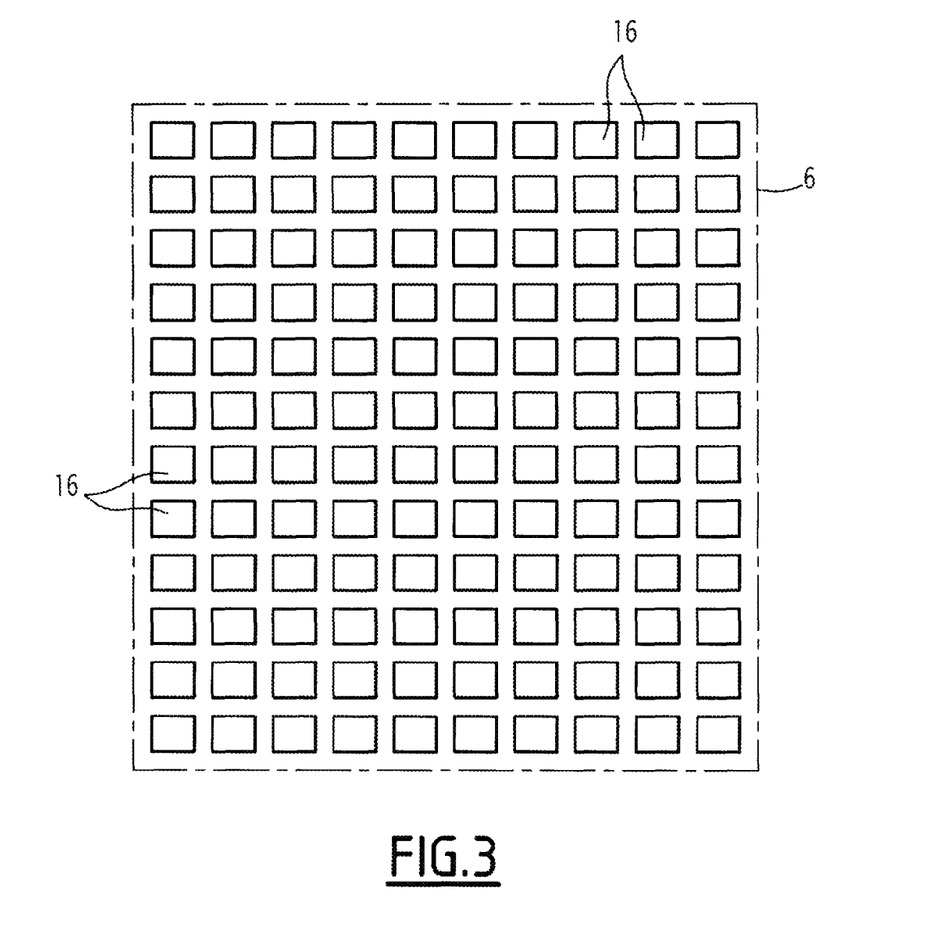
FIG. 3 is a schematic top view of a configuration assembly.

As seen in FIG. 3, the actuators 16 are distributed under the touch panel 6 (the contour of which is shown here in dotted lines), for example in a matrix arrangement in rows and columns (here twelve lines and ten columns).

The repair of actuators 16 makes it possible to deform different areas of the touch panel 6 as a function of the actuators 16 which are activated or not.

Each actuator 16 has for example, in top view, that is, perpendicularly to the front surface of the touch panel 6, an extent that is inscribed in a square of 10 mm side, in particular a square of 5 mm side.

The distance between each actuator and each adjacent actuator 16 is for example between 0.2 cm and 1.0 cm, in particular between 0.3 cm and 0.7 cm.

The more the extent of each actuator 16 and/or the distance between adjacent actuators 16 is reduced, the more the shape of the front surface 6A of the touch panel 6 can be finely modified.

Preferably, the human-machine interface device 4 comprises at least one configuration wherein several actuators 16 in the active configuration together define a single control element 24 protruding from the front surface 6A of the touch panel 6.

Each control element 24 is in the form of a bump protruding from the front surface 6A of the touch panel 6, each control element 24 allowing interaction of the user with the touch panel 6 detectable by the touch panel 6. In particular, the sensitive layer 12 is configured to detect an interaction of the user with each control element 24.

Each control element 24 is for example a push button, a cursor, a dial or a touchpad.

A control element 24 defining a push button has for example a square, rectangular or circular shape.

A control element 24 allows user interaction by pressing the control element 24 or moving a finger close to the control element 24 to trigger an action associated with the control element 24.

A control element 24 defining a cursor has for example the shape of an elongated bump. The elongated bump can extend along a straight or curvilinear line. Such a control element 24 can be associated, for example, with a command to adjust a sound volume or to adjust a zoom of an image.

A control element 24 defining a cursor allows the user to interact by moving their finger along the control element 24.

A control element 24 defining a dial has for example the form of a bump in the shape of a disc or a circular ring having a center.

A control element 24 defining a dial allows the user to interact by moving one or more fingers on the control element 24 around the center of the control element 24, in one direction of rotation or in the other direction of rotation.

A control element 24 defining a touchpad has for example the shape of a bump having an upper surface in the form of a plate, for example with a rectangular or circular contour.

A control element 24 defining a touchpad allows the user to interact by moving one or more fingers on the upper surface of the control element 24, for example to move a pointer to an image or to write alphanumeric characters, for example to enter a name, a telephone number or an address.

Preferably, the human-machine interface device 4 is provided with a lighting device making it possible to display a luminous pictogram associated with each control element 24, the luminous pictogram being for example turned on when the corresponding control element 24 is active and turned off when the corresponding control element 24 is inactive.

Preferably, the human-machine interface device 4 comprises at least one actuator 16 which defines a first control element 24 in a first configuration of the human-machine interface device 4, and a second control element 24 in a second configuration of the human-machine interface device 4, the second configuration being distinct from the first configuration.

The first control element 24 and the second control element 24 are for example of the same type or different types, chosen in particular from a push button, a cursor, a dial or a touchpad.

The first control element 24 and the second control element 24 are different but share one or more common actuators 16, each in active configuration both for the first control element 24 and the second control element 24.

The human-machine interface device 4 comprises a control module 26 configured to control the actuators 16 according to several predetermined configurations, each configuration corresponding to a respective shape of the front surface 6A of the touch panel 6, different from that of the other configurations.

In each predetermined configuration, the touch panel 6 is deformed in such a way as to form one or more control elements 24.

In each predetermined configuration, the sensitive layer 12 makes it possible to detect the user's interactions with each control element 24 defined in said predetermined configuration.

The control module 26 is, for example, configured to detect the user's interactions with the touch panel 6, more particularly with the front surface 6A of the touch panel 6, via the sensitive layer 12 connected to the control module 26.

Each configuration of the human-machine interface device 4 can be associated with a particular image or a particular menu of a graphical user interface of the human-machine interface device 4 displayed on a display screen 30 of the human-machine interface device 4.

One or more configurations of the human-machine interface device 4 can be associated with the same image or the same menu of the graphical user interface of the human-machine interface device 4.

When several configurations are associated with the same image or the same menu of the human-machine interface device 4, the selection of one of the configurations is carried out depending on the current situation.

Advantageously, the human-machine interface device 4 is configured to select and implement each configuration depending on the current situation.

In one embodiment, the human-machine interface device 4 is configured to implement a configuration as a function of a signal provided by a detection system 32 configured to detect the user's behavior.

The detection system 32 comprises, for example, one or more behavior sensors 34 and a behavior detection module 36 configured to determine a user's behavior as a function of the signals provided by the behavior sensors 34.

Each behavior sensor 34 comprises for example a camera, a radar or a biometric sensor.

The behavior detection module 36 is for example configured to provide a signal representative of a user mental load level, that is, a user's load level.

The human-machine interface device 4 is, for example, configured, in a given situation, to implement a complex configuration associated with the given situation if the user's mental load level is low and a simple configuration associated with the given situation if the user's mental load level is high.

The complex configuration comprises for example more control elements 24 than the simple configuration.

FIGS. 4 to 8 show examples of configuration of the human-machine interface device 4.

Figure 4:
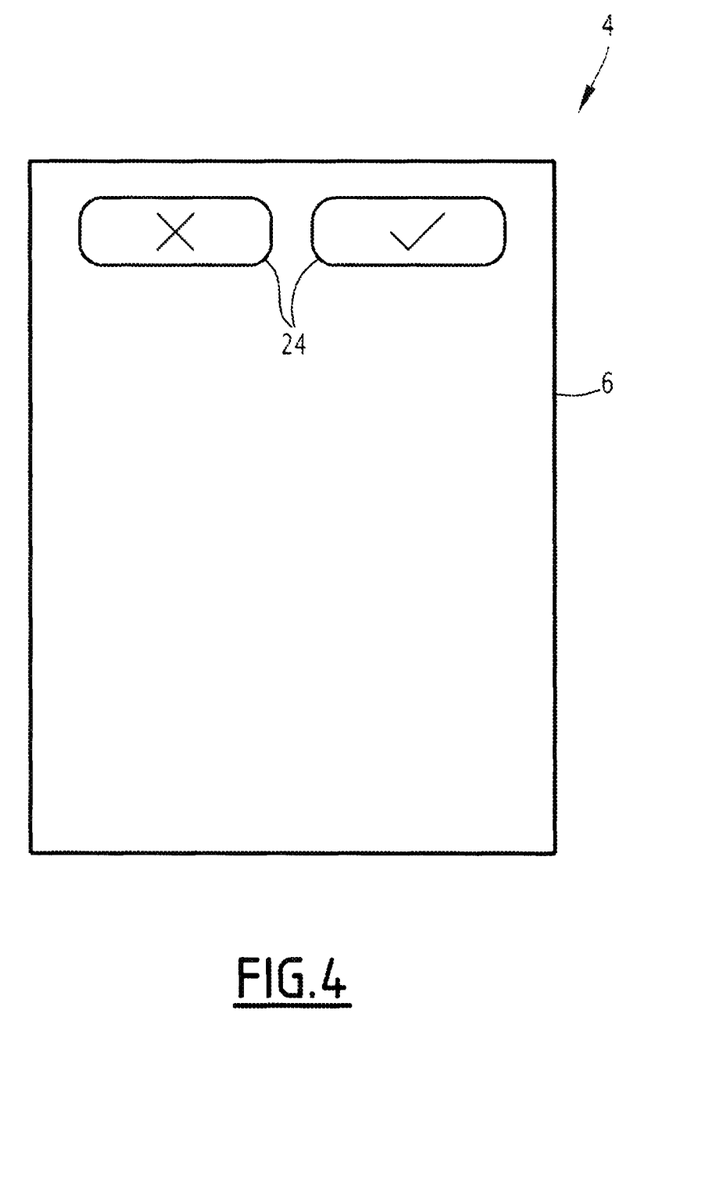
FIGS. 4 to 8 are top views of a touch panel of the human-machine interface device of FIGS. 1 and 2, in different configurations.

In FIG. 4, the human-machine interface device 4 is in a configuration with two control elements 24 in the form of push-buttons located at the top of the front surface 6A of the touch panel 6. An illuminated pictogram is displayed on each control element 24.

A control element 24 could for example be associated with a command to accept an incoming telephone call via a communication device such as a telephone connected to the human-machine interface device 4, and the other to a command to deny an incoming telephone call.

Figure 5:
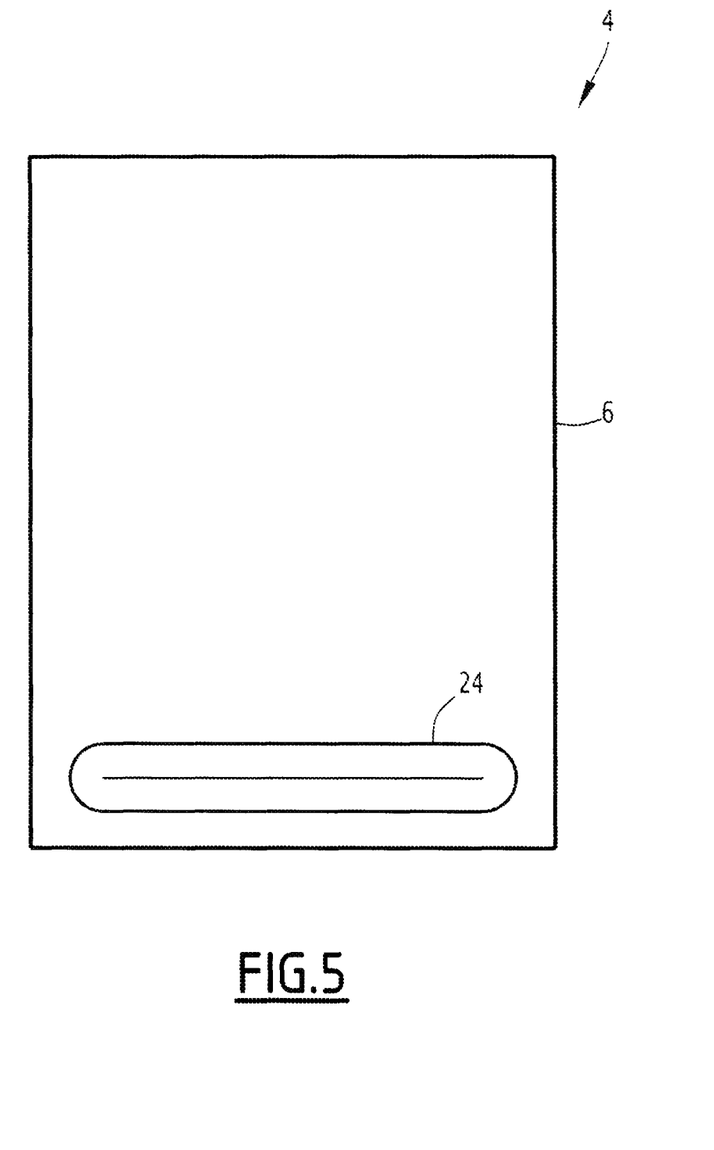

In FIG. 5, the human-machine interface device 4 is in a configuration with one control element 24 in the form of a cursor located at the bottom of the front surface 6A of the touch panel 6. An illuminated pictogram is displayed on the control element 24.

The control element 24 could for example be associated with a command for scrolling pages on a graphical user interface associated with the human-machine interface device.

Figure 6:
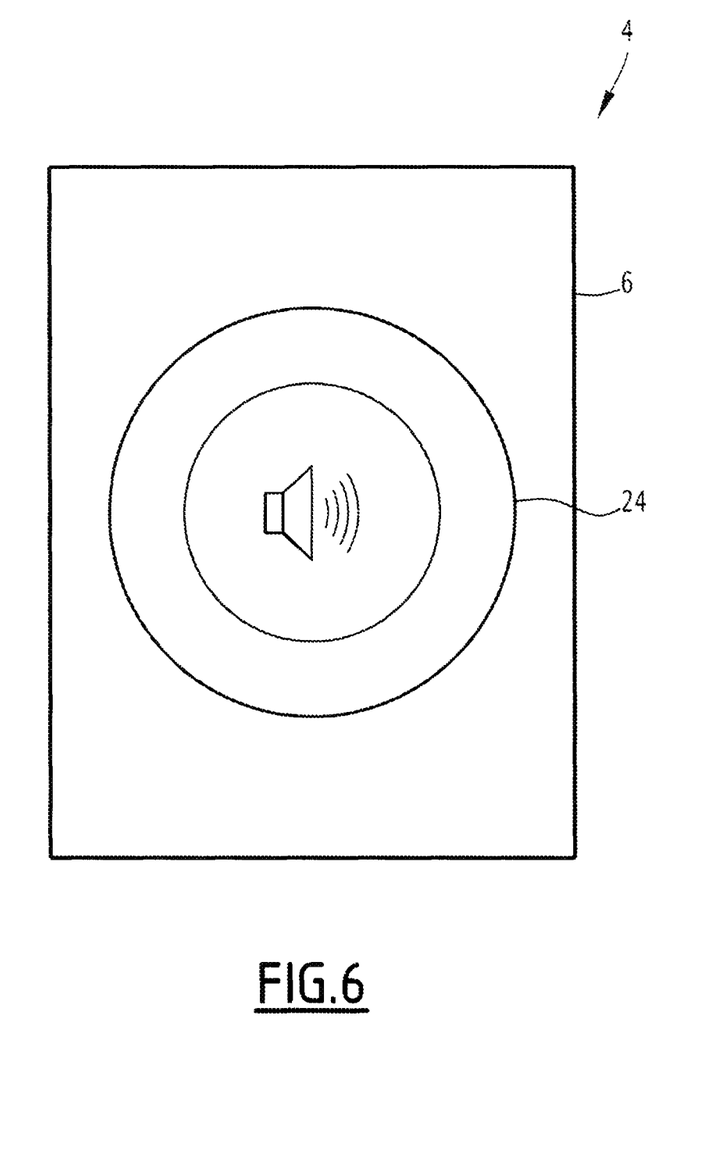

In FIG. 6, the human-machine interface device 4 is in a configuration with one control element 24 in the form of a dial located at the center of the front surface 6A of the touch panel 6. An illuminated pictogram is displayed on the control element 24.

The control element 24 could for example be associated with a control of a sound volume of a controllable sound reproduction system via the human-machine interface device 4.

Figure 7:
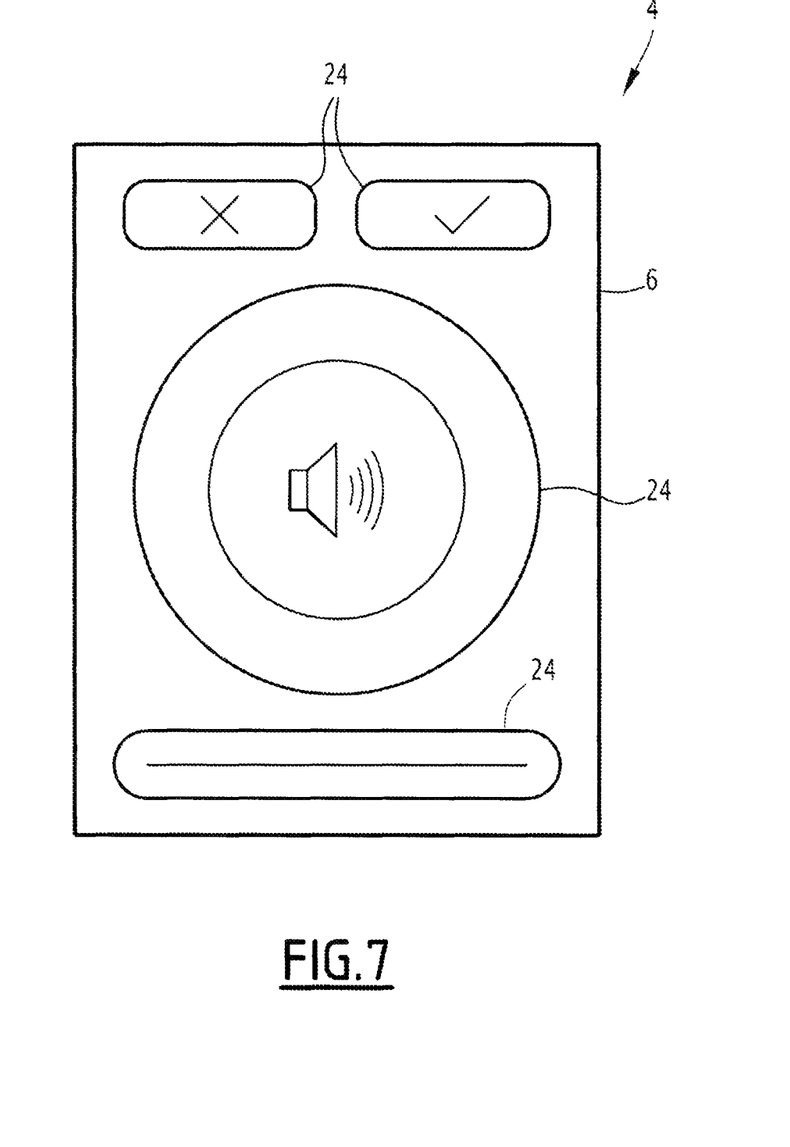

In FIG. 7, the human-machine interface device 4 is in a configuration combining the configurations of FIGS. 4 to 6, with two control elements 24 in the form of push-buttons located at the top of the front surface 6A of the touch panel 6, a control element 24 in the form of a cursor located at the bottom of the front surface 6A of the touch panel 6 and a control element 24 in the form of a dial located at the center of the front surface 6A of the touch panel 6.

On each of the configurations of FIGS. 4 to 7, each control element 24 is formed by resilient deformation of the touch panel 6 by activating several adjacent actuators 14. Each control element 24 is more extensive than a single actuator 14.

During an incoming telephone call, depending on the mental load of the user, the human-machine interface device 4 is configured to use the simple configuration of FIG. 4 or the complete configuration of FIG. 7.

Figure 8:
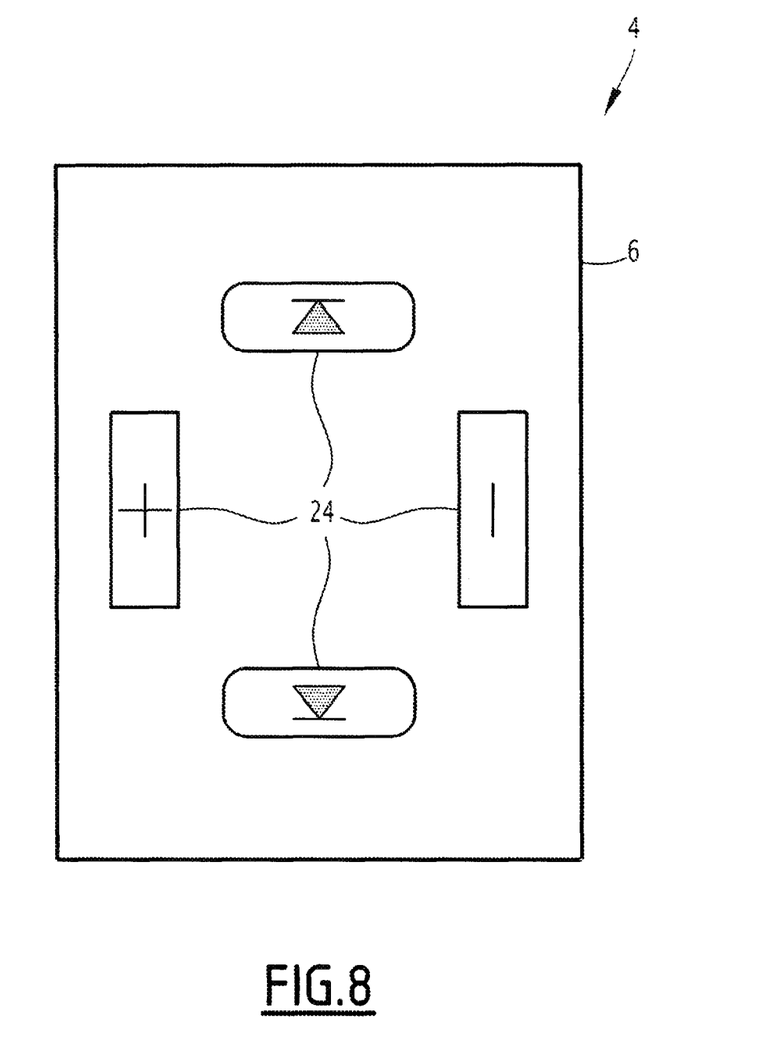

In FIG. 8, the human-machine interface device 4 is in a configuration with four control elements 24 in the form of push buttons located at the center of the front surface 6A of the touch panel 6. An illuminated pictogram is displayed on each control element 24.

The control elements 24 could be associated with commands of a sound reproduction system, for example with commands to switch to the next or previous piece of music in a list of music pieces and commands to increase or decrease the sound level.

Each of the control elements 24 of the configuration of FIG. 8 uses actuators common to the control element 24 in the form of a dial of FIGS. 6 and 7.

Thus, each of the common actuators 14 is active in a first configuration (FIG. 6 or 7) to form a control element 24 and active in a second configuration (FIG. 8) to form another control element 24.

By virtue of the human-machine interface device 4 having a configurable touch panel 6, it is possible to propose different configurations adapted as a function of the circumstances, in particular depending on the state of a graphical user interface or on the availability of the user, to limit demands on the user's attention to just what is needed when the user is busy with other tasks or to give access to more features when the user is more available.

Each control element 24 formed protruding from the front surface 6A of the touch panel 6 allows the user to identify the position of the control element 24 by touch. The user can thus interact with the control element 24 more easily than with a virtual button on a graphical user interface. In particular, the user may locate the tactile control element 24 without looking at the touch panel 6, and, for example in the case of a vehicle, without diverting their gaze from the road.

A dielectric elastomer actuator 16 may have a thin thickness, in particular thinner than a pneumatic or electromechanical actuator. A dielectric elastomer actuator 16 is easy to assemble, reliable over time (e.g. no risk of pneumatic pressure loss) and offers great freedom of shape creation for each control element 24.

The invention claimed is:

1. A human-machine interface device, comprising:
a touch panel having a front surface intended to be visible to a user and a rear surface, the touch panel being configured to detect an interaction of said user with the touch panel, the touch panel being resiliently deformable, and
a plurality of actuators arranged behind the touch panel, each actuator being controllable between a retracted configuration and an extended configuration wherein the actuator deforms an area of the touch panel located opposite the actuator by forming a bump protruding from the front surface of the touch panel,
the human-machine interface device comprising at least one configuration wherein a plurality of actuators in the extended position together define a single control element protruding from the front surface of the touch panel,
wherein the human-machine interface device is configured to implement each configuration according to complexity as a function of a user's behavior determined by a user behavior detection system, the detection system comprising one or more behavior sensors to determine the user's behavior representative of the user's mental load level.

2. The human-machine interface device according to claim 1, wherein each actuator is a dielectric elastomer actuator.

3. The human-machine interface device according to claim 1, wherein at least one of the actuators is in the extended position in at least two distinct configurations of said human machine interface device wherein said at least one actuator defines two different control elements.

4. The human-machine interface device according to claim 1, wherein the actuators are distributed behind the touch panel in a matrix arrangement.

5. The human-machine interface device according to claim 1, wherein the distance between each actuator and each adjacent actuator is between 0.2 cm and 1.0 cm.

6. The human-machine interface device according to claim 1, wherein the distance between each actuator and each adjacent actuator is between 0.3 cm and 0.7 cm.

7. The human-machine interface device according to claim 1, wherein the touch panel defines a plurality of sensors distributed on the touch panel.

8. The human-machine interface device according to claim 7, wherein the touch panel defines a respective sensor opposite each actuator.

9. The human-machine interface device according to claim 1, wherein the touch panel comprises an outer layer covering a sensitive layer configured to detect an interaction of said user with the touch panel.

10. The human-machine interface device according to claim 9, wherein the sensitive layer is a layer of stretchable ink printed by forming patterns defining each sensor.

11. The human-machine interface device according to claim 9, wherein the sensitive layer defines a plurality of sensors, in particular capacitive sensors and/or resistive sensors.

12. The human-machine interface device according to claim 11, wherein the sensitive layer is a layer of stretchable ink printed by forming patterns defining each sensor.

13. The human-machine interface device according to claim 1, wherein each behavior sensor comprises a camera, a radar, or a biometric sensor.

\* \* \* \* \*